(12) United States Patent
Lee et al.

(10) Patent No.: US 9,815,500 B1
(45) Date of Patent: Nov. 14, 2017

(54) WHEEL HOUSE REINFORCEMENT STRUCTURE

(71) Applicants: Hyundai Motor Company, Seoul (KR); Sungwoo Hitech Co., Ltd., Busan (KR)

(72) Inventors: Sang Ill Lee, Seoul (KR); Jang Gyeun Kim, Gyeonggi-do (KR); Mun Yong Lee, Busan (KR)

(73) Assignees: Hyundai Motor Company, Seoul (KR); Sungwoo Hitech Co., Ltd., Busan (KR)

( * ) Notice: Subject to any disclaimer, the term of this patent is extended or adjusted under 35 U.S.C. 154(b) by 0 days.

(21) Appl. No.: 15/247,017

(22) Filed: Aug. 25, 2016

(30) Foreign Application Priority Data

Apr. 21, 2016 (KR) .................. 10-2016-0048824

(51) Int. Cl.
*B62D 25/08* (2006.01)
*B62D 27/02* (2006.01)
*B62D 25/12* (2006.01)

(52) U.S. Cl.
CPC ......... *B62D 27/023* (2013.01); *B62D 25/088* (2013.01); *B62D 25/12* (2013.01)

(58) Field of Classification Search
CPC B62D 25/08; B62D 25/087088; B62D 25/12; B62D 25/2027; B62D 25/2036; B62D 27/023
USPC .................................................. 296/198, 76
See application file for complete search history.

(56) References Cited

U.S. PATENT DOCUMENTS

| 5,536,035 A * | 7/1996 | Bautz ................. B60G 3/20 280/124.139 |
| 6,206,459 B1 * | 3/2001 | Kim ................... B62D 25/16 296/198 |
| 6,241,309 B1 * | 6/2001 | Roehl ................. B62D 25/087 296/198 |
| 6,547,281 B1 * | 4/2003 | Iwatsuki ............. B60G 11/16 280/781 |
| 6,808,228 B1 * | 10/2004 | Leanza ............... B62D 25/087 296/187.11 |
| 9,616,937 B2 * | 4/2017 | Sasaki ................ B62D 25/088 |

(Continued)

FOREIGN PATENT DOCUMENTS

| CN | 102950389 A | 3/2013 |
| CN | 204279648 U | 4/2015 |

(Continued)

*Primary Examiner* — Gregory Blankenship
(74) *Attorney, Agent, or Firm* — Mintz Levin Cohn Ferris Glovsky and Popeo, P.C.

(57) ABSTRACT

A wheel house reinforcement structure is configured to reinforce stiffness of a wheel house in a vehicle body, and includes: a mounting part configured to form a top surface of an inner wheel house, and on which an absorber mounting bracket is mounted; a cover part integrally extending from the mounting part while being downward of an inner side end of the mounting part, and an assembling hole assembled with a quarter panel being formed in a lower side of the cover part; and a trunk lid mounting part integrally extending toward a rear direction in a top side of the mounting part, a hinge mounting end having a mounting hole in which a hinge portion of a trunk lid is mounted being formed at a rear end of the trunk lid mounting part.

13 Claims, 8 Drawing Sheets

(56) References Cited

U.S. PATENT DOCUMENTS

| | | | | |
|---|---|---|---|---|
| 2008/0122146 A1* | 5/2008 | Herntier | B62D 25/088 | 267/2 |
| 2010/0032229 A1* | 2/2010 | Kim | B62D 25/087 | 180/312 |
| 2010/0078970 A1* | 4/2010 | Kim | B62D 25/16 | 296/198 |
| 2010/0148538 A1* | 6/2010 | Neumann | B62D 25/087 | 296/203.04 |
| 2011/0156447 A1* | 6/2011 | Matsuoka | B62D 25/088 | 296/203.04 |
| 2013/0169006 A1* | 7/2013 | Sera | B62D 25/087 | 296/203.04 |
| 2014/0158567 A1* | 6/2014 | Park | B62D 25/02 | 206/335 |
| 2015/0108791 A1* | 4/2015 | Mildner | B62D 25/16 | 296/198 |
| 2015/0251703 A1* | 9/2015 | Yamada | B62D 25/087 | 296/187.12 |
| 2016/0221610 A1* | 8/2016 | Nishimura | B62D 25/087 | |
| 2016/0347141 A1* | 12/2016 | Fukutomi | B62D 25/088 | |
| 2016/0355064 A1* | 12/2016 | Amemiya | B62D 25/088 | |
| 2017/0001668 A1* | 1/2017 | Rioult | B62D 25/087 | |
| 2017/0197665 A1* | 7/2017 | Kabayama | B62D 25/087 | |

FOREIGN PATENT DOCUMENTS

| | | | |
|---|---|---|---|
| EP | 0985594 | A2 | 3/2000 |
| KR | 10-2015-0071789 | A | 6/2015 |

\* cited by examiner

WHEEL HOUSE REINFORCEMENT STRUCTURE

CROSS-REFERENCE TO RELATED APPLICATION

This application claims under 35 U.S.C. §119(a) the benefit of Korean Patent Application No. 10-2016-0048824 filed in the Korean Intellectual Property Office on Apr. 21, 2016, the entire contents of which are incorporated herein by reference.

BACKGROUND (a) Technical Field

The present invention relates to a wheel house reinforcement structure, and more particularly, to a wheel house reinforcement structure for reinforcing stiffness of a wheel house.

(b) Description of the Related Art

In general, stiffness of a vehicle body mounting part in a vehicle suspension is an important factor that influences NVH (Noise Vibration Harshness), i.e., a noise vibration characteristic of a vehicle and running and handling performance of the vehicle.

The suspensions are mounted between a front wheel of the vehicle and a vehicle body and between a rear wheel of the vehicle and the vehicle body, respectively. In generally, an end of the suspension is connected to a wheel of the vehicle and a knuckle connected with through the wheel, and another end of the suspension is connected with a wheel house.

The wheel house serves to protect a vehicle wheel mounted in the vehicle body. A front wheel house is installed in a front direction of the vehicle body. A rear wheel house is installed in a rear direction of the vehicle body.

The rear wheel house is coupled with a mounting bracket of a quarter part, a shock absorber part, and a trunk lid.

However, in the related art, the mounting bracket of the quarter part, the shock absorber part, and a trunk lid are configured as separate panels, and the respective panels are connected with each other by melt bonding so that connectivity is insufficient.

Further, in the related art, since separate panels are configured, a weight and a manufacturing cost are increased due to the increase of constituent elements, and a mounting time according to an assembling operation is increased.

The above information disclosed in this Background section is only for enhancement of understanding of the background of the invention and therefore it may contain information that does not form the prior art that is already known in this country to a person of ordinary skill in the art.

SUMMARY

The present invention provides a wheel house reinforcement structure having advantages of integrally mounting a quarter part, a shock absorber part, and a trunk lid.

Further, an exemplary embodiment of the present invention provides a wheel house reinforcement structure formed therein with a rib for reinforcing stiffness upon collision.

An exemplary embodiment of the present invention provides a wheel house reinforcement structure for reinforcing stiffness of a wheel house in a vehicle body, the wheel house reinforcement structure including: a mounting part configured to form a top surface of an inner wheel house, and on which an absorber mounting bracket is mounted; a cover part integrally extending from the mounting part while being downward of an inner side end of the mounting part, and an assembling hole assembled with a quarter panel being formed in a lower side of the cover part; and a trunk lid mounting part integrally extending toward a rear direction in a top side of the mounting part, a hinge mounting end having a mounting hole in which a hinge portion of a trunk lid is mounted being formed at a rear end of the trunk lid mounting part.

Further, engagement ends engaged with a floor mounting bracket may be formed in lower portions of front and rear inner surfaces in the cover part based on the assembling hole, respectively.

Further, the cover part may include a flange bonded to each inner end of front and rear panels forming a front surface and a rear surface of the inner wheel house and formed along a front side end and a rear side end.

Further, a bonding surface having a predetermined width may be formed in the cover part so that the quarter panel is bonded to a circumference of the assembling hole.

The mounting part may include a flange bonded to each inner end of front and rear panels forming a front surface and a rear surface of the inner wheel house and formed along a front side end and a rear side end.

Further, the mounting part may be engaged with the absorber mounting bracket by a stub bolt. Further, an exterior surface of the trunk lid mounting part is integrally formed with an outer side end of a top surface of the mounting part.

Further, the exterior surface may be supported on a top surface of the mounting surface through a plurality of partitions connected with the exterior surface in a width direction.

Further, the hinge mounting end may be configured by a top surface integrally extending along a top end of an exterior surface of the trunk lid mounting part.

Further, the mounting part may include a plurality of parallel ribs formed in a width direction on a bottom surface to be spaced apart from each other by a predetermined distance.

Further, the cover part may include a plurality of transverse ribs transversely formed in an inner surface of the cover part, and a plurality of longitudinal ribs formed across the transverse ribs to connect the transverse ribs to each other.

Further, the trunk lid mounting part may include a plurality of transverse ribs transversely formed in an inner surface of the exterior surface, and a plurality of longitudinal ribs. Further, a first rib (of the plurality of transverse ribs) and a second rib (of the plurality of longitudinal ribs) may have a lattice shape.

Since the quarter part, the shock absorber part, and the trunk lid are integrally mounted, connectivity between constituent elements may be increased, and a weight may be reduced.

A manufacturing cost may be reduced while simplifying assembly, and the stiffness of the wheel house can be reinforced.

Other various effects may be directly or indirectly disclosed in the following description of the embodiment of the present invention.

DETAILED DESCRIPTION OF THE EMBODIMENTS

Figure 1:
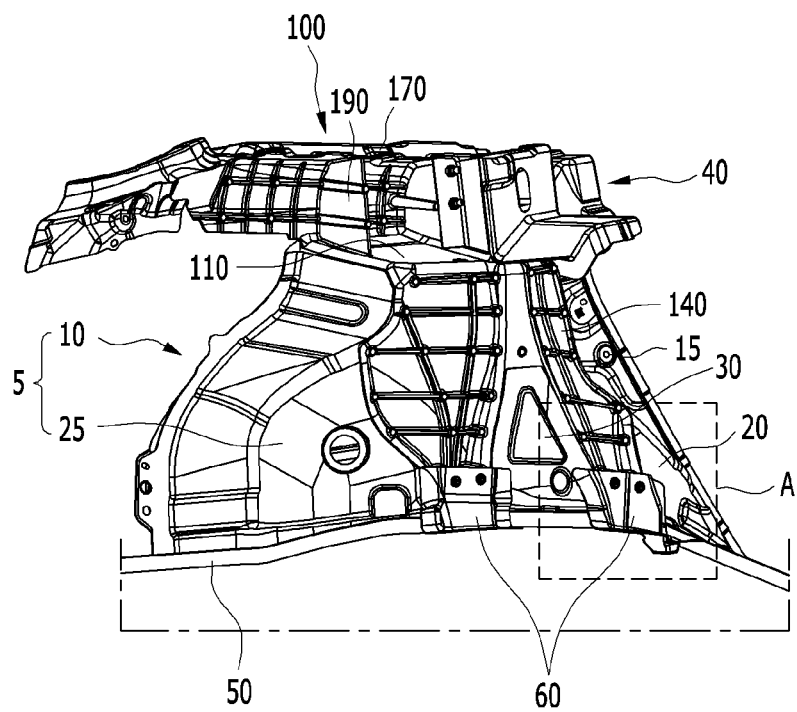
FIG. 1 is a partial perspective view illustrating a vehicle body to which a wheel house reinforcement structure according to an exemplary embodiment of the present invention is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or" and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an operation principle of a wheel house reinforcement structure according to the exemplary embodiment of the present invention will be described with reference to the accompanying drawings. However, the drawings and detailed description relate to one of various exemplary embodiments to efficiently describe characteristics of the present invention. Accordingly, the present invention is not limited to the following drawings and description.

Hereinafter, the exemplary embodiment of the present invention will be described with reference to the accompanying drawings.

Figure 2:
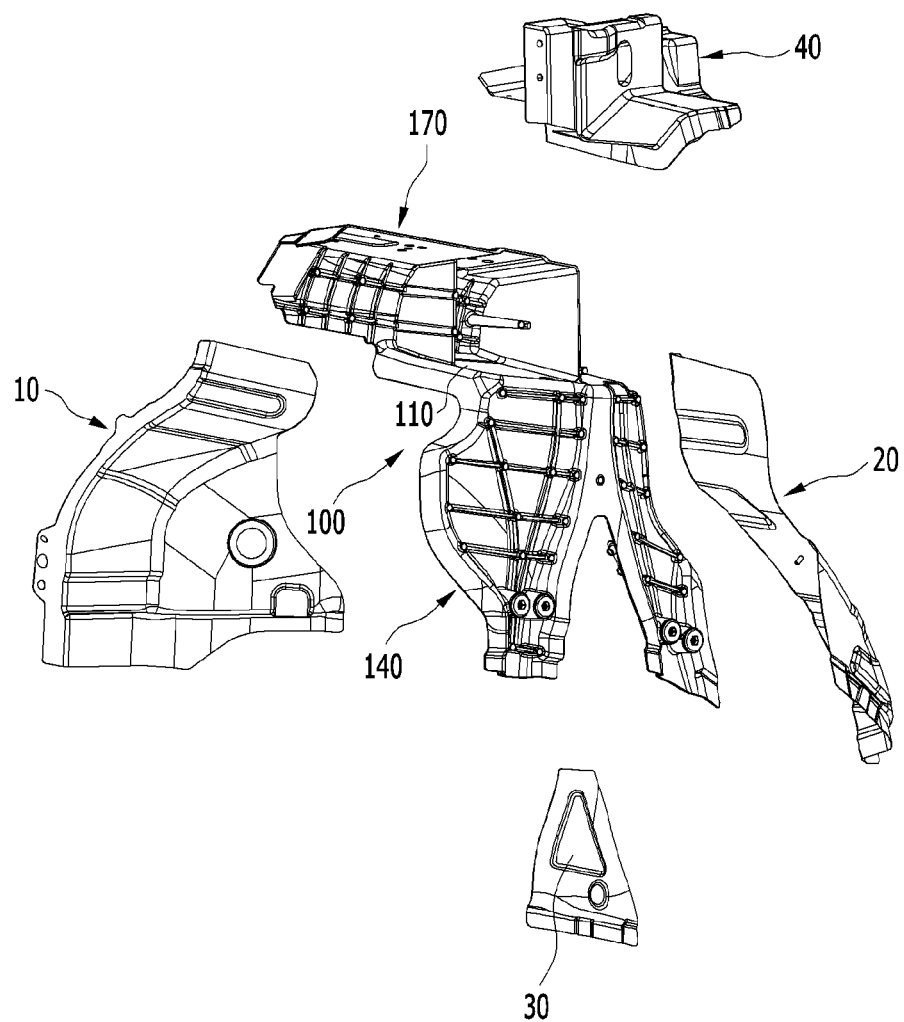
FIG. 2 is an exploded perspective view illustrating a vehicle body to which a wheel house reinforcement structure according to an exemplary embodiment of the present invention is applied.
Figure 3:
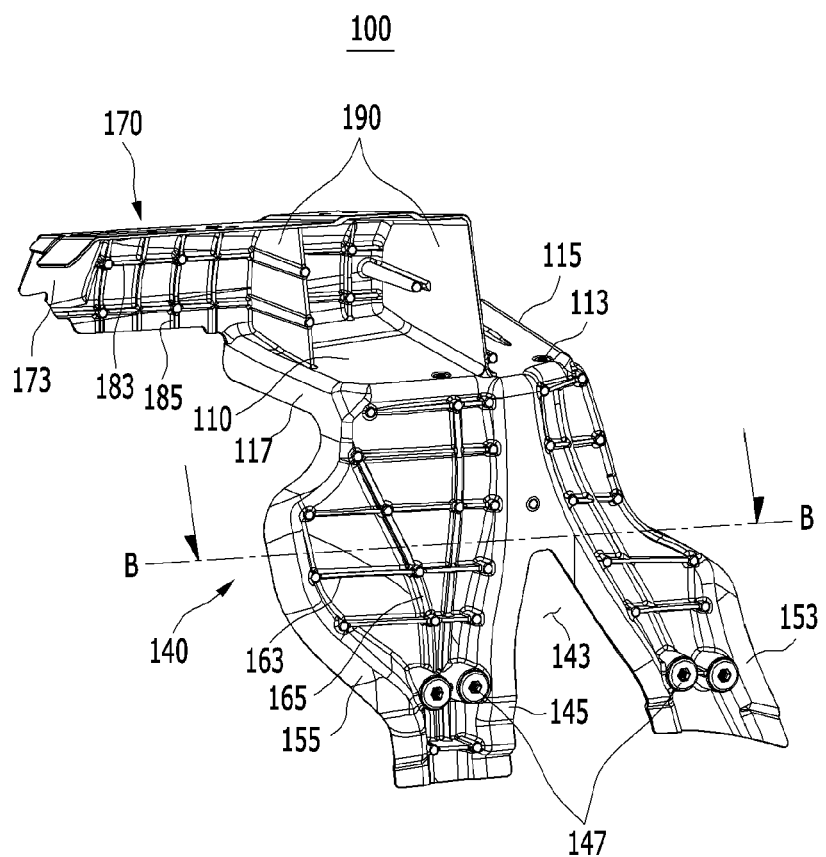
FIG. 3 is a perspective view illustrating a wheel house reinforcement structure according to an exemplary embodiment of the present invention.
Figure 4:
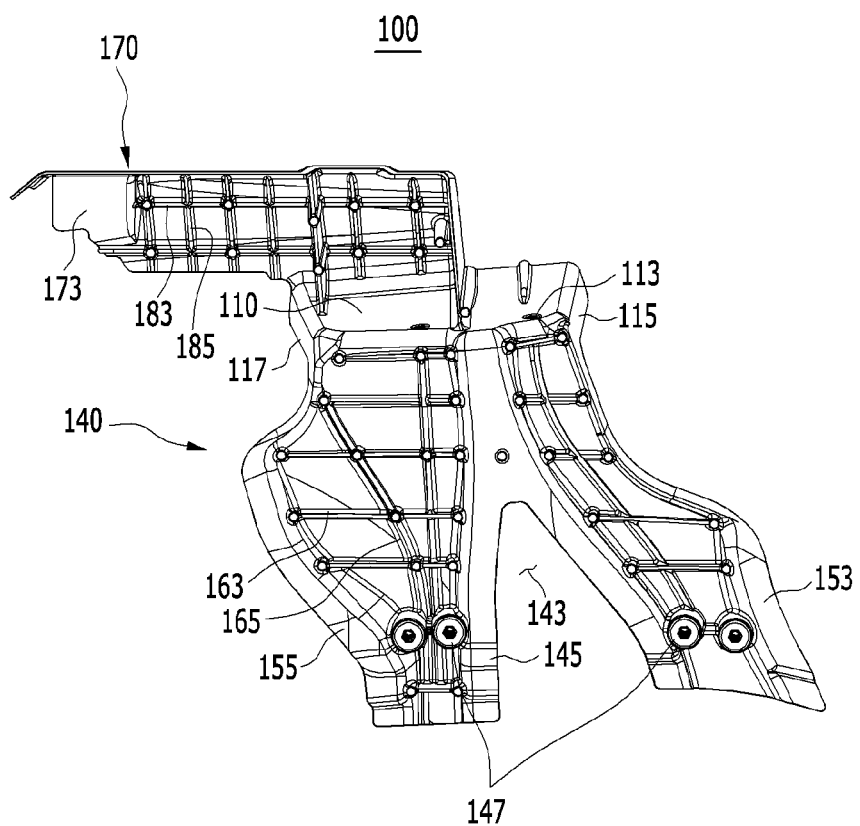
FIG. 4 is a front view illustrating a wheel house reinforcement structure according to an exemplary embodiment of the present invention.

FIG. 1 is a partial perspective view illustrating a vehicle body to which a wheel house reinforcement structure according to an exemplary embodiment of the present invention is applied, FIG. 2 is an exploded perspective view illustrating a vehicle body to which a wheel house reinforcement structure according to an exemplary embodiment of the present invention is applied, FIG. 3 is a perspective view illustrating a wheel house reinforcement structure according to an exemplary embodiment of the present invention, and FIG. 4 is a front view illustrating a wheel house reinforcement structure according to an exemplary embodiment of the present invention.

Referring to FIG. 1 and FIG. 2, a vehicle body includes a wheel house 5, a shock absorber mounting bracket 40, a rear floor side member 50, and a wheel house reinforcement structure 100.

The wheel house 5 protects a vehicle wheel mounted in a vehicle body. A front wheel house is installed in a front direction of the vehicle body. A rear wheel house is installed in a rear direction of the vehicle body. In this case, the rear wheel house will be described by way of example.

Further, the wheel house 5 includes an inner wheel house 10 and an outer wheel house 15. In this case, the outer side refers to an outdoor side based on a vehicle, and the inner side refers to an indoor side based on the vehicle.

The inner wheel house 10 includes a front panel 20 and a rear panel 25. The front panel 20 forms a front surface of the inner wheel house 10, and the rear panel 25 forms a rear surface of the inner wheel house 10.

The absorber mounting bracket 40 connects the wheel house reinforcement structure 100 to a shock absorber. The absorber mounting bracket 40 is mounted on a top surface of the wheel house reinforcement structure 100.

In this case, the top surface refers to a top portion based on a height direction of the vehicle, and the rear surface refers to a bottom portion based on the height direction of the vehicle.

The rear floor side member 50 connects a rear floor (not shown) to a vehicle wheel. That is, the rear floor side member 50 is connected with the wheel house reinforcement structure 100 through a floor mounting bracket 60.

As shown in FIGS. 1-4, the wheel house reinforcement structure 100 according to an exemplary embodiment of the present invention includes a mounting part 110, a cover part 140, and a trunk lid mounting part 170.

The mounting part 110 forms a top surface of the inner wheel house 10. That is, the mounting part 110 may horizontally cover a top surface of the inner wheel house 10.

Figure 5:
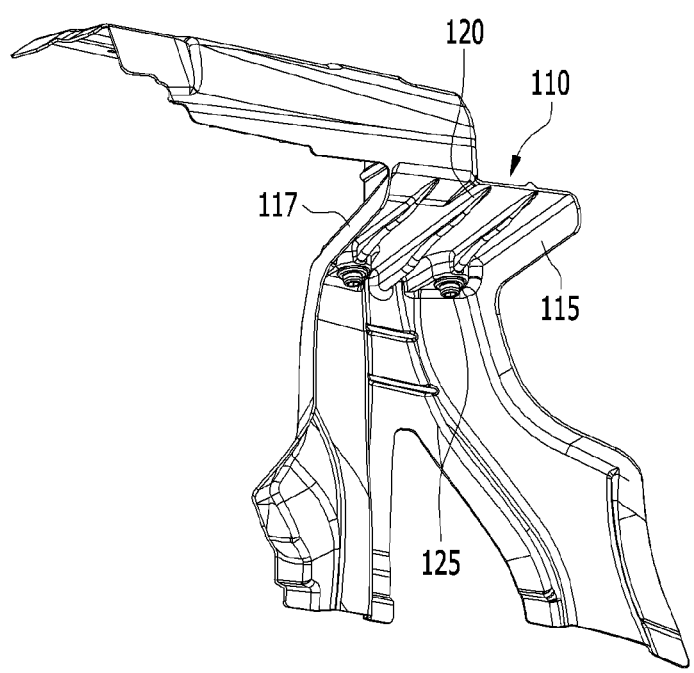
FIG. 5 is a perspective view illustrating an outer side of a wheel house reinforcement structure according to an exemplary embodiment of the present invention.

The mounting part 110 includes first and second flanges 115 and 117 to be bonded to the inner wheel house 10. The first flange 115 is formed in a front side end of the mounting part 110 as shown in FIG. 5, and the second flange 117 is formed in a rear end of the mounting part 110 as shown in FIG. 5. The first flange 115 is bonded to a top end of the front panel 20, and the second flange 117 is bonded to a top end of the rear panel 25.

An absorber mounting bracket 40 is mounted on the mounting part 110. That is, the absorber mounting bracket 40 is mounted on a rear direction of a top surface of the mounting part 110.

A coupling hole 113 is formed in a front direction of the top surface of the mounting part 110. As shown in FIG. 5, in the mounting part 110, a stub bolt 125 engages with a coupling hole 113 to be coupled with the shock absorber mounting bracket 40.

As shown in FIG. 5, a parallel rib 120 is formed on a bottom surface of the mounting part 110. In this case, a plurality of parallel ribs is formed on a bottom surface of the mounting part 110 to be spaced apart from each other by a predetermined distance. The parallel rib is formed parallel with the vehicle in a width direction on a bottom surface of the mounting part 110.

The cover part 140 is integrally formed with one side of the mounting part 110. That is, the cover part 140 integrally extends from the mounting part 110 downward in a height direction of the vehicle.

An assembling hole 143 is formed at a lower portion of the cover part 140 so that the quarter panel 30 is assembled with the assembling hole 143.

A bonding surface 145 having a predetermined width is formed in the cover part 140 so that the quarter panel 30 is bonded to a circumference of the assembling hole 143. An outer shape of the bonding surface 145 may be the same as an outer shaper of the quarter panel 30.

The assembling hole 143 may have a triangle shape. In this case, the above embodiment illustrates that the shape of the assembling hole 143 is the triangle shape by way of example. However, the present invention is not limited thereto. That is, the shape of the assembling hole 143 may be changed according to a shape of the quarter panel 30.

Figure 6:
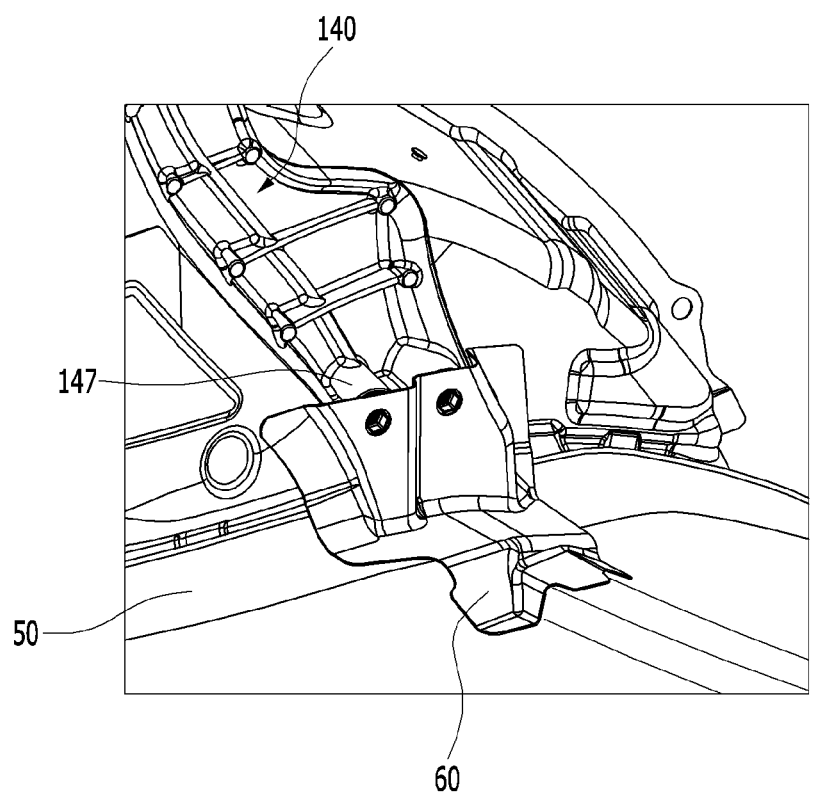
FIG. 6 is an enlarged view illustrating a region A shown in FIG. 1.

As shown in FIG. 6, the cover part 140 is formed therein with an engagement end 147 to be engaged with the floor mounting bracket 60.

The engagement ends 147 are formed in lower portions of front and rear inner surfaces of the cover part based on the assembling hole 143, respectively. The engagement end 147 is engaged with the floor mounting bracket 60 through a bolt to connect a rear floor side member 50 with the cover part of the wheel house reinforcement structure 100. Accordingly, the wheel house reinforcement structure 100 according to an exemplary embodiment of the present invention engages with the rear floor side member 50 by the bolt so that connectivity between constituent elements may be increased.

The cover part 140 forms an inner surface of the inner wheel house 10. Third and fourth flanges 153 and 155 are formed at both sides of the cover part 140, respectively.

The third flange 153 is formed in a front side end of the cover part 140. The third flange 153 may be integrally formed with the first flange 115 downward of one side of the first flange 115. The third flange 153 is bonded to a front panel 20 of the inner wheel house 10.

The fourth flange 155 is formed in a rear side end of the cover part 140. The fourth flange 155 may be integrally formed with the second flange 117 downward of one side of the second flange 115. A top end of the fourth flange 155 may be rounded downward of the second flange 117. The fourth flange 155 is bonded with a rear panel of the inner wheel house 10.

A transverse rib 163 and a longitudinal rib 165 are formed in an inner surface of the cover part 140.

The transverse rib 163 is transversely formed in the inner surface of the cover part 140. A plurality of transverse ribs 163 may be formed in the inner surface of the cover part 140 to be spaced apart from each other by a predetermined distance.

The transverse rib 163 may be formed parallel with the mounting part 110. That is, the transverse rib 163 may be formed parallel with the rear floor side member 50.

The longitudinal rib 165 is longitudinally formed in the inner surface of the cover part 140. The longitudinal rib 165 is formed across a longitudinal direction to be connected with the transverse rib 163. A plurality of longitudinal ribs 165 may be formed in the inner surface of the cover part 140.

Figure 7:
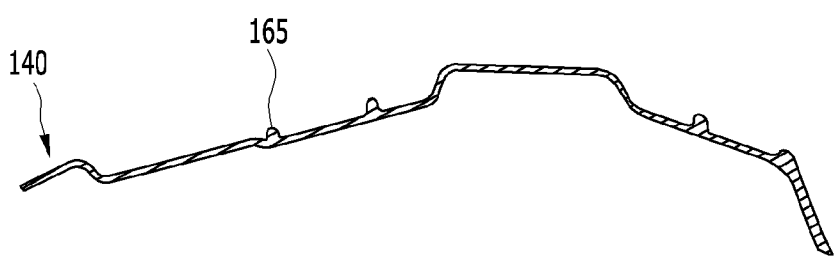
FIG. 7 is a cross-sectional view taken along line B-B of FIG. 3.

As shown in FIG. 7, longitudinal ribs 165 may be spaced apart from each other by a predetermined distance.

The trunk lid mounting part 170 is formed at a top side of the mounting part 110. The trunk lid mounting part 170 is integrally formed with a rear direct of the top side of the mounting part 110.

The trunk lid mounting part 170 includes first and second ribs 183 and 185 which are formed in an inner surface of an outer side part 173.

The first rib 183 is transversely formed in the inner surface of the outer side part 173. A plurality of first ribs 183 is formed in the inner surface of an outer side part 173. The first ribs 183 may be formed in the inner surface of an outer side part 173 to be spaced apart from each other by a predetermined distance.

The second rib 185 is longitudinally formed in the inner surface of the outer side part 173. The second rib 185 is formed across the first rib 183. The second ribs 185 may be formed in the inner surface of an outer side part 173 to be spaced apart from each other by a predetermined distance.

The first rib 183 and the second rib 185 have a lattice shape. Meanwhile, although the above embodiment illustrates that the first rib 183 and the second rib 185 have the lattice shape by way of example, the present invention is not limited thereto.

Figure 8:
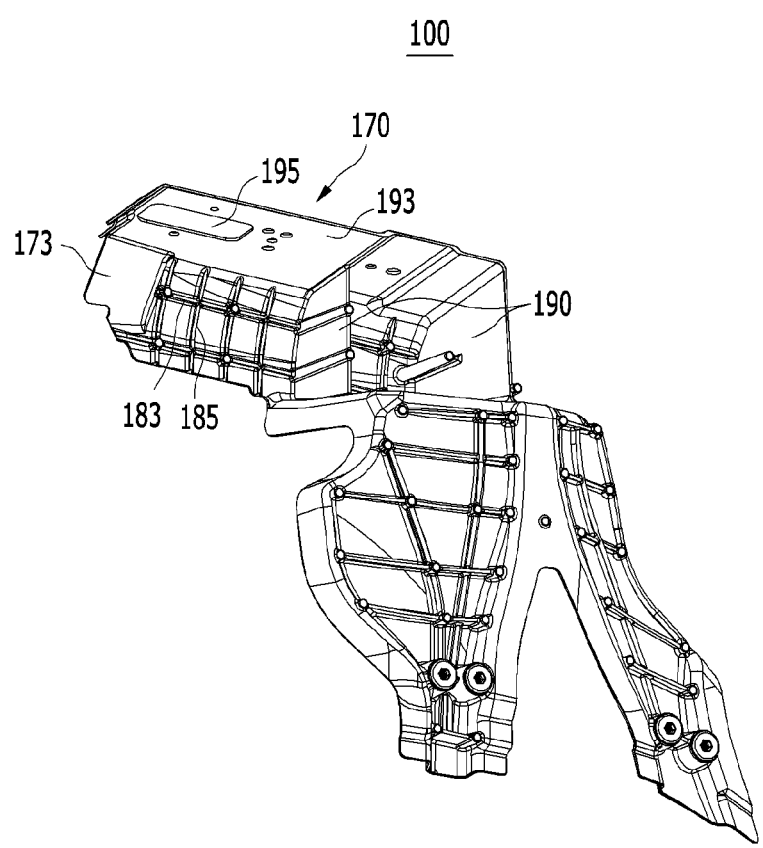
FIG. 8 is a perspective view illustrating an inner side of a wheel house reinforcement structure according to an exemplary embodiment of the present invention.

As shown in FIG. 8, a partition 190 is formed in the trunk lid mounting part 170.

A plurality of partitions 190 may be formed in a width direction on a top surface of the mounting part 110 to be spaced apart from each other by a predetermined distance. The partition 190 fixes an outer side 173 of the trunk lid mounting part 170 to the mounting part 110. That is, the outer side 173 is supported on a top surface of the mounting part 110 through a plurality of partitions 190.

As shown in FIG. 8, a hinge mounting part 193 is formed in the trunk lid mounting part 170.

The hinge mounting part 193 is configured as a top surface integrally extending from a top end of the outer side 173. That is, the hinge mounting part 193 may be formed perpendicular to the top end of the outer side 173.

A mounting hole 195 is formed at a rear end of the hinge mounting part 193 so that a hinge portion (not shown) of a trunk lid is formed in the mounting hole 195.

Accordingly, the wheel house reinforcement structure 100 according to an exemplary embodiment of the present invention includes the mounting part 110, the cover part 140, and the trunk lid mounting part 170 which are integrally formed, and is bonded to the wheel house 5 so that stiffness of the wheel house 5 may be reinforced to improve running stability.

In addition, if the wheel house reinforcement structure 100 according to an exemplary embodiment of the present invention configured as above is applied to the vehicle, a plurality of quarter parts, an absorber part, and a trunk lid according to the related art are integrally mounted so that the connectivity between constituent elements may be increased, a weight may be reduced and the manufacturing cost may be reduced while simplifying the assembly.

An exemplary embodiment of the present invention is disclosed herein, but the present invention is not limited to the disclosed embodiments, but, on the contrary, is intended to cover various modifications and equivalent arrangements included within the appended claims and the detailed description and the accompanying drawing of the present invention.

What is claimed is:

1. A wheel house reinforcement structure for reinforcing stiffness of a wheel house in a vehicle body, the wheel house reinforcement structure comprising:
    a mounting part configured to form a top surface of an inner wheel house, and on which an absorber mounting bracket is mounted;
    a cover part integrally extending from the mounting part while being downward of an inner side end of the mounting part, and an assembling hole assembled with a quarter panel being formed in a lower side of the cover part; and
    a trunk lid mounting part integrally extending toward a rear direction in a top side of the mounting part, a hinge mounting end having a mounting hole in which a hinge portion of a trunk lid is mounted being formed at a rear end of the trunk lid mounting part.

2. The wheel house reinforcement structure of claim 1, wherein:
    engagement ends engaged with a floor mounting bracket are formed in lower portions of front and rear inner surfaces in the cover part based on the assembling hole, respectively.

3. The wheel house reinforcement structure of claim 1, wherein the cover part comprises a flange bonded to each inner end of front and rear panels forming a front surface and a rear surface of the inner wheel house and formed along a front side end and a rear side end.

4. The wheel house reinforcement structure of claim 1, wherein:
    a bonding surface having a predetermined width is formed in the cover part so that the quarter panel is bonded to a circumference of the assembling hole.

5. The wheel house reinforcement structure of claim 1, wherein the mounting part comprises a flange bonded to each inner end of front and rear panels forming a front surface and a rear surface of the inner wheel house and formed along a front side end and a rear side end.

6. The wheel house reinforcement structure of claim 1, wherein the mounting part is engaged with the absorber mounting bracket by a stub bolt.

7. The wheel house reinforcement structure of claim 1, wherein an exterior surface of the trunk lid mounting part is integrally formed with an outer side end of a top surface of the mounting part.

8. The wheel house reinforcement structure of claim 7, wherein the exterior surface is supported on a top surface of the mounting surface through a plurality of partitions connected with the exterior surface in a width direction.

9. The wheel house reinforcement structure of claim 7, wherein the hinge mounting end is configured by a top surface integrally extending along a top end of an exterior surface of the trunk lid mounting part.

10. The wheel house reinforcement structure of claim 1, wherein the mounting part comprises a plurality of parallel ribs formed in a width direction on a bottom surface to be spaced apart from each other by a predetermined distance.

11. The wheel house reinforcement structure of claim 1, wherein the cover part comprises:
    a plurality of transverse ribs transversely formed in an inner surface of the cover part, and
    a plurality of longitudinal ribs formed across the transverse ribs to connect the transverse ribs to each other.

12. The wheel house reinforcement structure of claim 7, wherein the trunk lid mounting part comprises:
    a plurality of transverse ribs transversely formed in an inner surface of the exterior surface, and
    a plurality of longitudinal ribs.

13. The wheel house reinforcement structure of claim 12, wherein a first rib of the plurality of transverse ribs, and a second rib of the plurality of longitudinal ribs, have a lattice shape.

* * * * *